US012760840B2

(12) United States Patent
Yogev

(10) Patent No.: US 12,760,840 B2
(45) Date of Patent: Oct. 13, 2026

(54) SYSTEM AND METHOD FOR COMPRESSING AND STORING GAS

(71) Applicant: AUGWIND LTD., Yakum (IL)

(72) Inventor: Or Yogev, Gedera (IL)

(73) Assignee: AUGWIND LTD., Yakum (IL)

( * ) Notice: Subject to any disclaimer, the term of this patent is extended or adjusted under 35 U.S.C. 154(b) by 115 days.

(21) Appl. No.: 18/871,047

(22) PCT Filed: May 31, 2023

(86) PCT No.: PCT/IL2023/050561
§ 371 (c)(1),
(2) Date: Dec. 2, 2024

(87) PCT Pub. No.: WO2023/233407
PCT Pub. Date: Dec. 7, 2023

(65) Prior Publication Data
US 2025/0341281 A1 Nov. 6, 2025

(30) Foreign Application Priority Data
Jun. 2, 2022 (IL) ........................................ 293583

(51) Int. Cl.
*F17C 1/00* (2006.01)

(52) U.S. Cl.
CPC ...... *F17C 1/007* (2013.01); *F17C 2201/0119* (2013.01); *F17C 2201/0128* (2013.01);
(Continued)

(58) Field of Classification Search
None
See application file for complete search history.

(56) References Cited

U.S. PATENT DOCUMENTS 12,155,205 B2 * 11/2024 Ramamurthy ......... G06Q 50/06
2011/0259442 A1 10/2011 Mcbride
(Continued)

FOREIGN PATENT DOCUMENTS

CA 2679108 A1 * 9/2008 ................ F17C 7/02
CA 3055620 A1 * 9/2018 ................ F02C 6/16
(Continued)

*Primary Examiner* — Kyle Armstrong
(74) *Attorney, Agent, or Firm* — FisherBroyles, LLP; Roger L. Browdy; Ronni S. Jillions

(57) ABSTRACT

A compression system and method for compression of a gas having a temperature greater than an underground soil temperature within the earth is described. The system includes a gas compressing vessel arranged underground within the earth. The gas compressing vessel has thermally conductive walls with a circular cross-section of an inner side. An outer side of the walls is surrounded by a layer of a thermally conductive material, so as to maintain the compressed gas within the gas compressing vessel at a temperature of the soil during air compression and storage. The system also includes a water supply vessel arranged underground within the earth and a water pressurization system arranged on a pressurized water pipeline connecting the water supply vessel to the gas compressing vessel. The system also includes a water flow distributor arranged within the gas compressing vessel including at least one nozzle configured to direct a stream of the water pumped into the gas compressing vessel along the inner side of the thermally conductive in the direction where the inner side has the circular cross-section.

17 Claims, 8 Drawing Sheets

(52) U.S. Cl.
CPC ................. *F17C 2203/0612* (2013.01); *F17C 2223/0123* (2013.01); *F17C 2227/0114* (2013.01); *F17C 2227/0348* (2013.01); *F17C 2227/0381* (2013.01); *F17C 2250/043* (2013.01); *F17C 2270/0147* (2013.01)

(56) References Cited

U.S. PATENT DOCUMENTS

| | | | | |
|---|---|---|---|---|
| 2012/0102935 | A1 | 5/2012 | Ingersoll et al. | |
| 2013/0336721 | A1* | 12/2013 | McBride ................. | F17C 1/007 405/55 |
| 2017/0229941 | A1 | 8/2017 | Eftekharzadeh | |
| 2019/0107126 | A1 | 4/2019 | Baxter et al. | |
| 2021/0075297 | A1 | 3/2021 | Yogev | |
| 2021/0313835 | A1* | 10/2021 | Ramamurthy ......... | G06Q 50/06 |

FOREIGN PATENT DOCUMENTS

| | | | | |
|---|---|---|---|---|
| CA | 3099452 | A1 * | 11/2019 | .............. F04B 41/02 |
| EP | 3789609 | A1 * | 3/2021 | .............. H02J 15/20 |

* cited by examiner

SYSTEM AND METHOD FOR COMPRESSING AND STORING GAS

TECHNOLOGICAL FIELD

This invention relates generally to a system and method for compressing and storing gases.

BACKGROUND

It is known that compressed gas can be stored and utilized for many purposes. For example, stored compressed gas can be utilized in the glass and plastic container industry. However, consumption of compressed air in a glass and plastic container production plant is erratic, due to the nature of operation of plastic injection machines using compressed air. Each injection machine requires a short burst of high pressure air every few seconds (one burst per injection). When several of such machines are arranged in a production line, the air consumption profile is unsteady and erratic. A typical plant includes a compression train in which motor-driven compressors compress a certain gas, such as air. Due to the unsteady and erratic consumption profile of compressed air, operation of compressors, in order to supply high pressure air, results in long and often occurring idle time periods, hence energy waste. The erratic behavior of the consumption profile can be mitigated by increasing operating pressure, that likewise results in energy waste. Therefore, using a high volume tank containing and storing compressed air can provide a solution which can overcome the abovementioned problems.

Moreover, the stored potential energy of compressed gas can be utilized for generation of electrical power. The potential energy can, for example, be collected from natural energy sources which are effectively inexhaustible and are abundantly available throughout the world in various forms, such as wind, solar, tidal and wave energy. The energy obtained from natural energy sources can be stored in the form of potential energy of compressed gas, so as to be releasable during periods of power demand, as required.

Various compressed air storage systems are generally known for the purpose of storing compressed gas. Gas storage tanks can, for example, be constructed on the ground surface, under the ground, and under water.

Pressurizing gases is a challenge in all industries. When compressing a gas adiabatically, i.e., reducing the gas volume in a thermo-isolated system, heat is generated in addition to increase in the gas pressure. On the other hand, the process is isothermal when all the heat produced, due to the gas compression, is continuously removed from the compressed gas by heat exchange with the surroundings during the compression.

Isothermal gas compression requires significantly less energy than adiabatic compression operating over the same volume decrease ratio. In other words, work done on the gas during gas compression in an adiabatic process is greater than work done in the isothermal process, for the same decrease in gas volume.

Conventional compressors typically are operated under near adiabatic conditions, since the heat generated during compression cannot be sufficiently exchanged with the surrounding environment in the time scale of the compression. Accordingly, isothermal compressors may be a more effective alternative for compressed air energy storage (CAES) techniques.

Various heat transfer mechanisms can be used to remove heat energy from the gas being compressed during the compression process. For example, in order to achieve isothermal compression, liquid spray or foam can be injected into the compression chamber to mix it with the air in order to absorb generated compression heat. In this case, heat energy in the gas being compressed within a pressure vessel can be transferred to the liquid or foam used to compress the gas.

U.S. Patent Application Publication No. 2019/107126 describes a near isothermal system and method for compressing a gas. A low-pressure gas is drawn into a vessel through a source gas inlet. A liquid is pumped into the vessel through a liquid inlet such that the low-pressure gas is compressed to produce a high-pressure gas. In order to make the compression substantially isothermal, the liquid inlet may be a spray nozzle causing the liquid entering the vessel to form a spray. The gas may be a vapor, and the liquid may strip the vapor from the gas.

U.S. Patent Application Publication No. 2012/0102935 describes a compressed air system that includes a hydraulic actuator that can be used to compress a gas within a pressure vessel. An actuator can be actuated to move a liquid into a pressure vessel such that the liquid compresses gas within the pressure vessel. In such a compressor system, during the compression, heat can be transferred to the liquid used to compress the air. The compressor system can include a liquid purge system that can be used to remove at least a portion of the liquid to which the heat energy has been transferred, such that the liquid can be cooled and then recycled within the system.

SUMMARY

Despite the prior art in the area of adiabatic and isothermal compression systems, there is still a need in the art for further improvement in order to provide a more effective compression system. Thus, it would be useful to have a novel gas compression system having an improved and/or optimized heat removal mechanism during a gas compression process.

The present invention partially eliminates disadvantages of prior art systems for gas compression and provides a new approach for compressing gas by using equalization of a gas temperature to the underground temperature of the soil of the earth.

It is known that a temperature of ambient air above the ground changes in time from night to day. For example, in a desert, the ambient air temperature can change between 10° C. during the night to 40° C. during the day. However, it is known that at depths greater than about 30 feet (9.12 m) below the earth surface, the soil temperature remains relatively constant throughout the year.

For example, experimental investigations (G. B. Reddy, International Journal of Ambient Energy, 2000, Vol. 21, Issue 4, Pages 196-202) of subsurface ground temperature show that the ground temperature of soil at depths greater than 10 feet (3.04 m) remains relatively constant through the year. In particular, at a depth of 10 feet, the mean ground temperature of soil is 75.12° F. (23.96° C.) in summer and 75.87° F. (24.37° C.) in winter. For the daily ambient air temperature variation, the mean temperature of the underground soil is less than the mean temperature of the ambient air above the ground. The temperature differential between the ambient air and the ground soil temperatures at 10 feet can be 8-17° F. (4.4-9.4° C.).

Thus, since the earth can serve as an "infinite" heat capacitor, the present invention teaches to use the earth as a heat pump during air compression.

The present invention provides a novel compression system for gas compression. The gas compression system of the present invention can be most beneficial for compression of gas having a temperature greater than an underground soil temperature within the earth, since it is based on decreasing the temperature of the gas during compression to the underground soil temperature. In this case, the gas compression requires significantly less energy than isothermal compression, and a fortiori less than adiabatic compression operating over the same volume decrease ratio. Accordingly, work done on the gas during gas compression by the system of the present invention is less than the work done in the isothermal and adiabatic processes for the same decrease in gas volume.

According to an embodiment of the present invention, the compression system includes a gas compressing vessel arranged underground within the earth. The gas compressing vessel is configured to accumulate and store potential energy in the form of compressed gas and pressurized water. The gas compressing vessel has thermally conductive walls. The gas compressing vessel has a circular cross-section of an inner side of the thermally conductive walls at least at an upper portion of the gas compressing vessel. The gas compressing vessel has an outer side of the thermally conductive walls being surrounded by a layer of a thermally conductive material filling a space between the outer side and soil of the earth, so as to maintain the compressed gas within the gas compressing vessel at a temperature of the soil during air compression and storage.

According to an embodiment of the present invention, the compression system includes a water supply vessel arranged underground within the earth and configured to hold water. The water supply vessel has thermally conductive walls. The water supply vessel has an outer side of the thermally conductive walls being surrounded by another layer of a thermally conductive material, filling a space between the outer side and the surrounding soil, so as to hold the water within the water supply vessel at the temperature of the soil.

According to an embodiment of the present invention, the thermally conductive material of the layers surrounding the thermally conductive walls of the gas compressing vessel and the water supply vessel has adhesive properties sufficient for adhesion with the thermally conductive walls and the soil. This provision enables facilitation of heat exchange from the thermally conductive walls to the soil via the thermally conductive material of the layers surrounding the thermally conductive walls.

According to an embodiment of the present invention, the compression system includes a pressurized water pipeline hydraulically coupled to the gas compressing vessel and to the water supply vessel. The pressurized water pipeline is configured to provide hydraulic communication between the gas compressing vessel and the water supply vessel.

According to an embodiment of the present invention, the compression system includes a water pressurization system arranged on the pressurized water pipeline. The water pressurization system includes a pump configured for controllable pumping water from the water supply vessel into the gas compressing vessel, so that a desired flow rate of the water is maintained through the pressurized water pipeline.

According to an embodiment of the present invention, the compression system includes a water flow distributor arranged within the gas compressing vessel. The water flow distributor is coupled to the water pressurization system via the pressurized water pipeline. The water flow distributor includes one or more nozzles configured to direct a stream of the water pumped into the gas compressing vessel along the inner side of the thermally conductive walls of the gas compressing vessel in the direction where the inner side has the circular cross-section. This provision enables circulating the water stream inside the gas compressing vessel along the inner side.

According to an embodiment of the present invention, the compression system also includes a gas inlet manifold pneumatically coupled to the gas compressing vessel for providing gas into the gas compressing vessel for compression.

According to an embodiment of the present invention, the compression system also includes an inlet gas valve arranged on the gas inlet manifold. The inlet gas valve is configured for control of supply of the gas into the gas compressing vessel.

According to an embodiment of the present invention, the compression system also includes a gas providing system arranged on the gas inlet manifold and pneumatically coupled to the gas compressing vessel. The gas providing system is configured to provide gas into the gas compressing vessel for compression.

According to an embodiment of the present invention, the compression system also includes a water inlet pipeline hydraulically coupled to the water supply vessel. The water inlet pipeline is configured to supply water to the water supply vessel.

According to an embodiment of the present invention, the compression system also includes an inlet water valve arranged on the water inlet pipeline. The inlet water valve is configured to control supply of water into the water supply vessel.

According to an embodiment of the present invention, the compression system also includes a control system coupled to the water pressurization system that is arranged on the pressurized water pipeline. The control system is configured to regulate the flow of the water pumped into the gas compressing vessel through the pressurized water pipeline.

According to an embodiment of the present invention, the control system includes a gas pressure sensor arranged within the gas compressing vessel. The gas pressure sensor is configured for producing gas pressure sensor signals indicative of a pressure of the compressed gas in the gas compressing vessel.

According to an embodiment of the present invention, the control system also includes an electronic controller operatively coupled to the water pressurization system and to the gas pressure sensor. In operation, the electronic controller is responsive to the gas pressure sensor signals and is capable of generating control signals for actuating the pump of the water pressurization system when the gas pressure in the gas compressing vessel is less than a predetermined pressure of the compressed gas.

According to an embodiment of the present invention, the compression system also includes a compressed gas exchange manifold. The compressed gas exchange manifold is pneumatically coupled to the gas compressing vessel. The gas exchange manifold is configured to supply the compressed gas to a user at the desired pressure.

According to an embodiment of the present invention, the compression system also includes a gas release valve, arranged on the compressed gas exchange manifold. The gas release valve is configured for controlling supply of the compressed gas to the user.

According to an embodiment of the present invention, the compression system also includes a water discharge pipeline. The water discharge pipeline is hydraulically coupled to the gas compressing vessel. The water discharge pipeline is configured to remove water accumulated at a bottom of the gas compressing vessel after gas compressing.

According to an embodiment of the present invention, the compression system also includes a gas pump and an air supply manifold. The gas pump is configured to provide air within the gas compressing vessel at a required pressure. The air supply manifold is pneumatically coupled to the gas pump and to the gas inlet manifold. The air supply manifold is configured to supply air provided by the gas pump into the gas compressing vessel, at the required pressure that should be sufficient to remove the water accumulated at a bottom of the gas compressing vessel, through the water discharge pipeline after gas compressing.

According to an embodiment of the present invention, the compression system also includes a Venturi pump. The Venturi pump is arranged on the pressurized water pipeline. The Venturi pump includes a Venturi air manifold. The Venturi air manifold is coupled to the pressurized water pipeline. The Venturi air manifold is configured for providing air into the Venturi pump. The Venturi pump includes a Venturi nozzle coupled to the pressurized water pipeline. The Venturi nozzle includes an expanding portion. The expanding portion has an incoming cross section and an outgoing cross section. An area of the incoming cross section is less than an area of the outgoing cross section.

The Venturi nozzle is configured (i) to receive a flow of fluid containing water passing from the water pressurization system through the pressurized water pipeline 31 and air provided by the Venturi air manifold; and (ii) and to increase a pressure of the air in the fluid to a predetermined value by the expanding portion.

According to another aspect of the present invention, there is provided a method for compression of a gas having a temperature greater than an underground soil temperature within the earth. The method includes decreasing the temperature of the gas during compression to the underground soil temperature within the earth.

According to an embodiment of the present invention, the decreasing of the temperature of the gas during compression includes activating the water pressurization system for controllable pumping water from the water supply vessel into the gas compressing vessel through the water flow distributor. As a result of activation of the water pressurization system, a stream of the water pumped into the gas compressing vessel can be directed along the inner side of the thermally conductive walls of the gas compressing vessel in the direction where the inner side has a circular cross-section, to circulate the water flow inside the gas compressing vessel along the inner side.

Circulating of the water stream can provide enhanced heat exchange between the gas and the water during gas compression and the thermally conductive walls of the gas compressing vessel. Since the underground soil temperature is less than the temperature of the compressed gas, the heat extracted from the gas to the water can further transfer from the water to the soil of the earth via the layer of thermally conductive material surrounding the gas compressing vessel.

The method also includes supplying the compressed gas to a user at a desired pressure. According to an embodiment of the present invention, the method includes providing to the system a compressed gas exchange manifold. The compressed gas exchange manifold is pneumatically coupled to the gas compressing vessel. The gas exchange manifold is configured to supply the compressed gas from the compressing vessel to a user at the desired pressure.

According to an embodiment of the present invention, the method includes providing to the system a gas release valve. The gas release valve is arranged on the compressed gas exchange manifold, and is configured for controlling supply of the compressed gas to the user.

According to an embodiment of the present invention, the method includes providing to the system a water discharge pipeline, hydraulically coupled to the gas compressing vessel. The water discharge pipeline is configured to remove water accumulated at a bottom of the gas compressing vessel after gas compressing, so as to be able to use the system for a new compressing cycle.

According to an embodiment of the present invention, the method includes providing to the system a gas pump capable to provide air at a required pressure, and an air supply manifold pneumatically coupled to the gas pump and to the to the gas inlet manifold. The air supply manifold is configured to supply air provided by the gas pump into the gas compressing vessel, at a pressure sufficient to remove the water accumulated at a bottom of the gas compressing vessel. When required, the water can be removed through the water discharge pipeline after gas compressing.

According to an embodiment of the present invention, the method further includes removing water accumulated at a bottom of the gas compressing vessel after gas compressing. The removal of water is done by supplying air by the gas pump into the gas compressing vessel, at a pressure sufficient to remove the water accumulated at a bottom of the gas compressing vessel, through the water discharge pipeline.

According to an embodiment of the present invention, the method includes providing to the system a Venturi pump, arranged on the pressurized water pipeline. The Venturi pump includes a Venturi air manifold coupled to the pressurized water pipeline. The Venturi air manifold is configured for providing air into the Venturi pump. The Venturi pump includes a Venturi nozzle, coupled to the pressurized water pipeline. The Venturi nozzle includes an expanding portion, having an incoming cross section and an outgoing cross section. An area of the incoming cross section is less than an area of the outgoing cross section. The Venturi nozzle is configured (i) to receive a flow of fluid containing water passing from the water pressurization system through the pressurized water pipeline and air provided by the Venturi air manifold; and (ii) and to increase a pressure of the air in the fluid to a predetermined value by the expanding portion.

The method also includes increasing a pressure of the air to a predetermined value by the Venturi pump.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The principles and operation of the gas compression system according to the present invention may be better understood with reference to the drawings and the accompanying description. It should be understood that these drawings are given for illustrative purposes only and are not meant to be limiting. It should be noted that the figures illustrating examples of the system of the present invention are not to scale, and are not in proportion, for purposes of clarity. It should be noted that the blocks, as well as other elements in the figures, are intended as functional entities only, such that the functional relationships between the entities are shown, rather than any physical connections and/or physical relationships. Examples of construction are provided for selected elements. Those versed in the art should appreciate that the examples provided have suitable alternatives which may be utilized.

Figure 1:
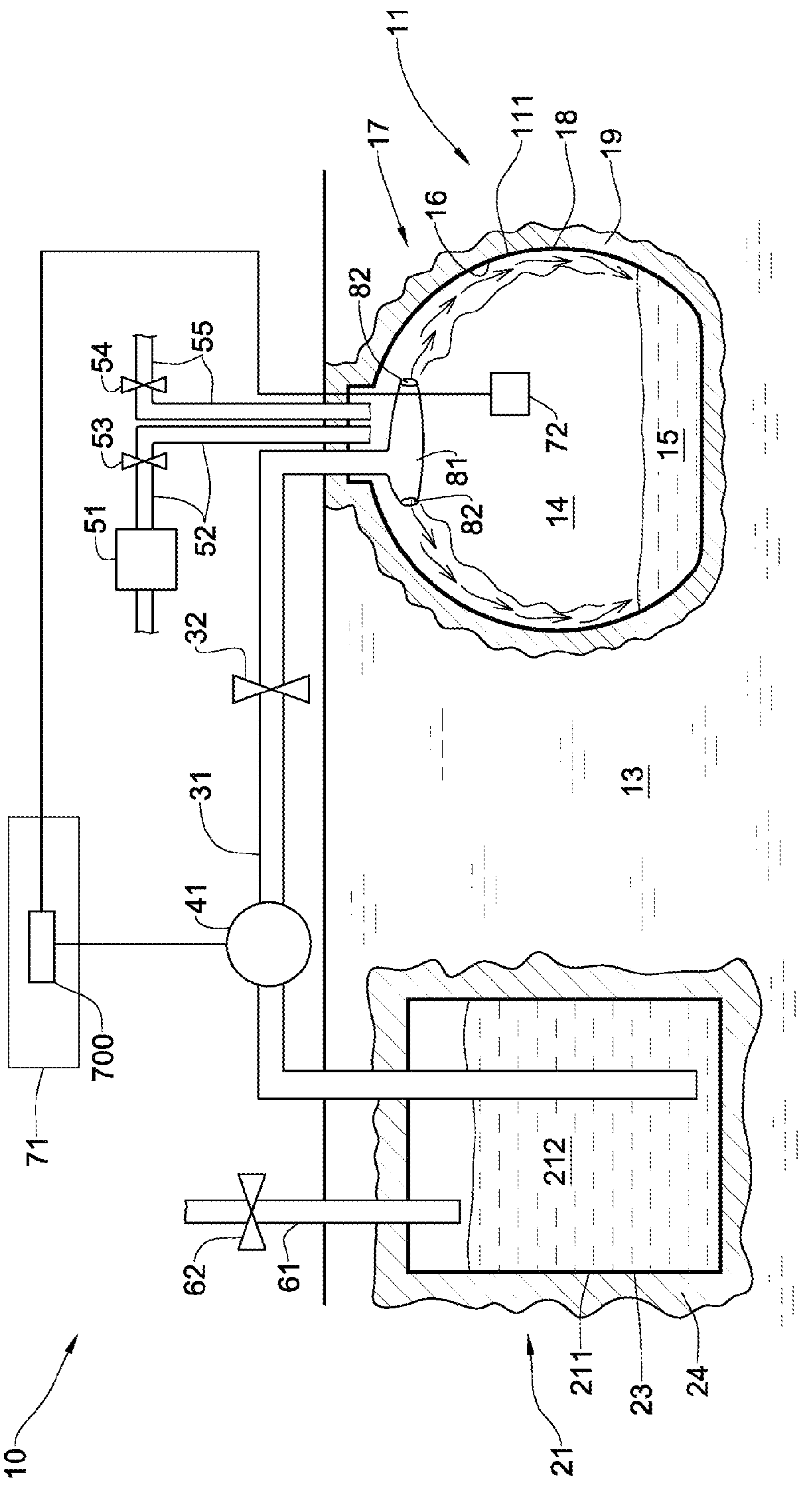
FIGS. 1 and 2 illustrate schematic cross-sectional side views of gas compression systems, according to some embodiments of the present invention.

Referring to FIG. 1, a schematic cross-sectional view of a gas compression system 10 is illustrated, according to an embodiment of the present invention. The gas compression system 10 of the present invention can be beneficial for compression of a gas having a temperature greater than an underground soil temperature within the earth, and can also be successfully employed for storing the compressed gas and pressurized water. Examples of the gas used for compression in the gas compression system 10 include, but are not limited to, air, nitrogen, etc.

The compression system 10 includes a gas compressing vessel 11 arranged underground within the earth 13. The gas compressing vessel 11 has thermally conductive walls 111 and is configured to accumulate and store potential energy in the form of compressed gas 14 and pressurized water 15. It should be understood that generally, the gas compressing vessel 11 can be constructed of a suitable metal or a composite material with wall thickness appropriate to withstand the strain on the walls caused by the gas-hydraulic pressure inside the gas compressing vessel 11.

According to an embodiment of the present invention, the gas compressing vessel 11 has a substantially spherical shape at least at an upper portion 17 of the gas compressing vessel 11 with a substantially circular cross-section of an inner side 16 of the thermally conductive walls 111. As used herein with respect to spherical/circular shapes, the term "substantially" refers to a degree of deviation from "sphericity" and "circularity" that is sufficiently small so as to not measurably detract from the spherical/circular shape. This approximation for the purpose of the present invention can, for example, be interpreted so as to include a deviation of 20% at least for the diameter of the upper portion 17, as long as there is no considerable change in the performance of the gas compression system 10 due to the deviation. The exact degree of deviation from the spherical/circular shape may depend on the specific context.

According to an embodiment of the present invention, the gas compressing vessel 11 has an outer side 18 of the thermally conductive walls 111 surrounded by a layer 19 of a thermally conductive material filling a space between the outer side 18 and soil of the earth 13. The thermally conductive material has adhesive properties sufficient for adhesion with the thermally conductive walls 111 and the soil, in order to facilitate heat exchange from the thermally conductive walls 111 to the soil via the layer 19 of thermally conductive material. This provision allows maintaining the compressed gas 14 during compression and storage within the gas compressing vessel 11 at a temperature of the soil during air compression and storage.

According to an embodiment of the present invention, the compression system 10 also includes a water supply vessel 21 arranged underground within the earth 13. The water supply vessel 21 has thermally conductive walls 211, and is configured to hold water 212 that can be supplied to the gas compressing vessel 11. The water supply vessel 21 has an outer side 23 of the thermally conductive walls 211 surrounded by another layer 24 of a thermally conductive material filling a space between the outer side 23 and the surrounding soil of the earth 13. The thermally conductive material of the layer 24 has adhesive properties sufficient for adhesion with the thermally conductive walls 211 and the soil, in order to facilitate heat exchange from the thermally conductive walls 211 to the soil via the thermally conductive material of the layer 24. This provision allows holding the water 212 within the water supply vessel 21 at the temperature of the soil.

It should be noted that the thermal conductivity of dry soils tends to increase as their texture becomes increasingly fine. This is a consequence of the fact that the thermal conductivity of air is about one hundred times less than that of solid soil particles. Finer soils have more particle-to-particle contact and smaller insulating air gaps between particles than coarse soils, hence increased thermal conductivity. Examples of a thermally conductive material suitable for the layers 19 and 24 include, but are not limited to, a cement based adhesive material including thermally conductive additives, e.g., fine metal powder, compacted sand, thermally conductive plastics, etc.

According to an embodiment of the present invention, the compression system 10 also includes a pressurized water pipeline 31 hydraulically coupled to the gas compressing vessel 11 and to the water supply vessel 21. The pressurized water pipeline 31 is configured to provide hydraulic communication between the gas compressing vessel 11 and the water supply vessel 22.

According to an embodiment of the present invention, the compression system 10 also includes a water pressurization system 41 and a pressurized water valve 32 arranged on the pressurized water pipeline 31. The water pressurization system 41 includes a pump (not shown) that is configured for pumping water 212 from the water supply vessel 21 into the gas compressing vessel 11 when the pressurized water valve 32 is open, so that a desired flow rate of the water is maintained through the pressurized water pipeline 31. The pressurized water valve 32 is configured to control supply of the pumping water and to prevent release of the compressed gas from the gas compressing vessel 11 through the water pressurization system 41 after completion of gas compression. In the gas compressing vessel 11, the water 15 is pressurized, thereby also compressing the gas 14. The compressed gas 14 is stored at high pressure in the gas compressing vessel 11.

According to an embodiment of the present invention, the compression system 10 also includes a water flow distributor 81 arranged within the gas compressing vessel 11. The water flow distributor 81 is coupled to the water pressurization system 41 via the pressurized water pipeline 31. The water flow distributor 81 includes one or more nozzles 82 configured to direct a stream of the water flow pumped into the gas compressing vessel 11 along the inner side 16 of the thermally conductive walls 111 of the gas compressing vessel 11 in the direction where the inner side 16 has the circular cross-section. This provision enables circulating the water stream inside the gas compressing vessel 11 along the inner side 16.

According to an embodiment of the present invention, the compression system 10 further includes a gas inlet manifold 52 pneumatically coupled to the gas compressing vessel 11 for providing gas into the gas compressing vessel 11 for compression. The compression system 10 also includes an inlet gas valve 53 arranged on the gas inlet manifold 52, is and configured for control of supply of the gas into the gas compressing vessel 11.

According to an embodiment of the present invention, in order to facilitate providing of the gas into the gas compressing vessel 11, the compression system 10 further includes a gas providing system 51 arranged on the gas inlet manifold 52 and pneumatically coupled to the gas compressing vessel 11. The gas providing system 51 can include a fan (not shown) or any other blowing device coupled to a gas source and configured to collect gas from the gas source and to provide the collected gas into the gas compressing vessel 11 for its further compression. When the gas is air, the gas providing system 51 is configured to collect atmospheric air and deliver it to the gas compressing vessel 11.

According to an embodiment of the present invention, the compression system 10 further includes a compressed gas exchange manifold 55 pneumatically coupled to the gas compressing vessel 11, and a gas release valve 54 arranged on the compressed gas exchange manifold 55. The compressed gas exchange manifold 55 is configured to supply the compressed gas 14 to a user at the desired pressure. According to the embodiment shown in FIG. 1, the compressed gas exchange manifold 55 is a pipeline directly coupled to the gas compressing vessel 11.

When required for safety reasons, the gas compressing vessel 11 can also include one or more safety valves (not shown) that can automatically open when a pressure in the gas compressing vessel 11 exceeds a certain pressure level during gas compression.

According to an embodiment of the present invention, the compression system 10 further includes a water inlet pipeline 61 passing from a water source, and hydraulically coupled to the water supply vessel 21. The water inlet pipeline 61 is configured to supply water to the water supply vessel 21. The compression system 10 also includes an inlet water valve 62 arranged on the water inlet pipeline 61, and is configured for controlling supply of water into the water supply vessel 21.

According to an embodiment of the present invention, the compression system 10 further includes a control system 71 coupled to the water pressurization system 41 arranged on the pressurized water pipeline 31, and is configured to regulate the flow of the water 212 pumped into the gas compressing vessel 11 through the pressurized water pipeline 31.

According to an embodiment of the present invention, the control system 71 includes a gas pressure sensor 72 arranged within the gas compressing vessel 11, and an electronic controller 700 operatively coupled to the water pressurization system 41 and to the gas pressure sensor 72. The electronic controller 700 can be implemented, for example, as electronic hardware, computer software, or combinations of both. The gas pressure sensor 72 is configured for producing gas pressure sensor signals indicative of a pressure of the compressed gas 14 in the gas compressing vessel 11. The electronic controller 700 is responsive to the gas pressure sensor signals and is capable of generating control signals for operating the water pump of the water pressurization system 41 for transferring water 212 to the gas compressing vessel 11 as long as the gas pressure in the gas compressing vessel 11 is less than a predetermined pressure of the compressed gas.

In operation, the gas compressing vessel 11 can be charged by filling gas via the gas inlet manifold 52. In order to facilitate providing of the gas into the gas compressing vessel 11, a gas providing system 51 coupled to a gas source (not shown) and arranged on the gas inlet manifold 52 can be used to collect gas from a gas source and to provide the collected gas into the gas compressing vessel 11 for its further compression.

When desired, the filling with gas can also be carried out by using one or more pneumatic compressors (not shown) that can be either a part of the system or located on a removable infrastructure (not shown). When required, the gas compressing vessel 11 can also be recharged to replace any gas that can be lost through operation of the compression system 10 by increasing the amount of the gas 14 that it contains.

When the gas is air, it can be collected from the atmosphere. The air can, for example, be at a temperature in the range of about 25° C. to 40° C. at an initial pressure of 1 atm. During the filling with the air or any other desired gas, the pressurized water valve 32 and the gas release valve 54 are closed.

In turn, the water supply vessel 21 is filled with water via the water inlet pipeline 61. Since the water supply vessel 21 has the thermally conductive walls 211 surrounded by a thermally conductive material between the outer side 23 of the gas compressing vessel 11 and the surrounding soil, a temperature of the water 212 inside the water supply vessel 21 after a certain time period can be equalized to the ground temperature of the soil that can, for example, be in the range of about 20° C.-25° C.

In the present invention, the term "about" means within a statistically meaningful range of a value. The allowable variation encompassed by the term "about" depends on the particular system under consideration, and can be readily appreciated by one of ordinary skill in the art. This approximation for the purpose of the present invention can, for example, be interpreted so as to include a deviation of 20% at least, as long as there is no considerable change in the performance of the gas storage system 10 due to the deviation.

After filling the gas compressing vessel 11 with gas and the water supply vessel 21 with water, the water pressurization system 41 is activated for controllable pumping water from the water supply vessel 21 into the gas compressing vessel 11 when the pressurized water valve 32 is open, while the inlet gas valve 53 and the gas release valve 54 are closed. The control is carried out by the electronic controller 700 so that a desired flow rate of the water is maintained through the pressurized water pipeline 31. The water pressurization system 41 is operated when the gas pressure in the gas compressing vessel 11 is less than a predetermined pressure of the compressed gas 14. In the gas compressing vessel 11, the water 15 is pressurized, thereby also compressing the gas 14. The compressed gas 14 can be stored at high pressure in the gas compressing vessel 11 after compression.

The operation principle of the system of the present invention is based on decreasing the temperature of the gas during compression to the underground soil temperature within the earth. Accordingly, the water flow provided by the water pressurization system 41 from the water supply vessel 21 into the gas compressing vessel 11 is provided to the water flow distributor 81. The nozzles 82 of the water flow distributor 81 direct a stream of the water flow pumped into the gas compressing vessel 11 along the inner side 16 of the thermally conductive walls 111 of the gas compressing vessel 11 in the direction where the inner side 16 has a circular cross-section. The water flow velocity and the curvature of surface of the inner side 16 of the thermally conductive walls 111 should have predetermined values required for circulating the water stream inside the gas compressing vessel 11 along the inner side 16, owing to a centripetal force exerted on the water in the stream. The circulating of the water stream can provide enhanced heat exchange between the gas 14 during its compression and the thermally conductive walls 111 of the gas compressing vessel 11. Since the underground soil temperature is less than the temperature of the compressed gas and the temperature of the pressurized water, the heat extracted from the gas 14 transfers to the water and further from the water to the soil of the earth 13 via the layer 19 of thermally conductive material surrounding the gas compressing vessel 11.

Since the inlet gas valve 53 and the gas release valve 54 are closed, and gas 14 is trapped in the upper portion 17 of the gas compressing vessel 11 between the water level and the top of the gas compressing vessel 11. As the water level in the gas compressing vessel 11 rises, the gas 14 is compressed, and the gas temperature can further increase when compared to the initial temperature of the gas before compression.

Due to the heat exchange, the circulating water stream can absorb the heat from the gas during compression that can be further transferred to the soil of the earth 13 via the layer 19 of thermally conductive material. Since the earth has very high heat capacity, all the heat during the heat exchange can dissipate without generating increase in the earth temperature. Accordingly, the gas temperature can be decreased from the initial temperature to the underground soil temperature within the earth, hence enabling a more efficient compressing cycle when compared with isothermal and adiabatic compression.

Although the gas compressing vessel 11 shown in FIG. 1 has a substantially spherical shape at an upper portion 17 with a substantially circular cross-section of an inner side of the thermally conductive walls 111 in a vertical plane, another gas compressing vessel having a substantially cylindrical shape at an upper portion is also contemplated.

Figure 2:
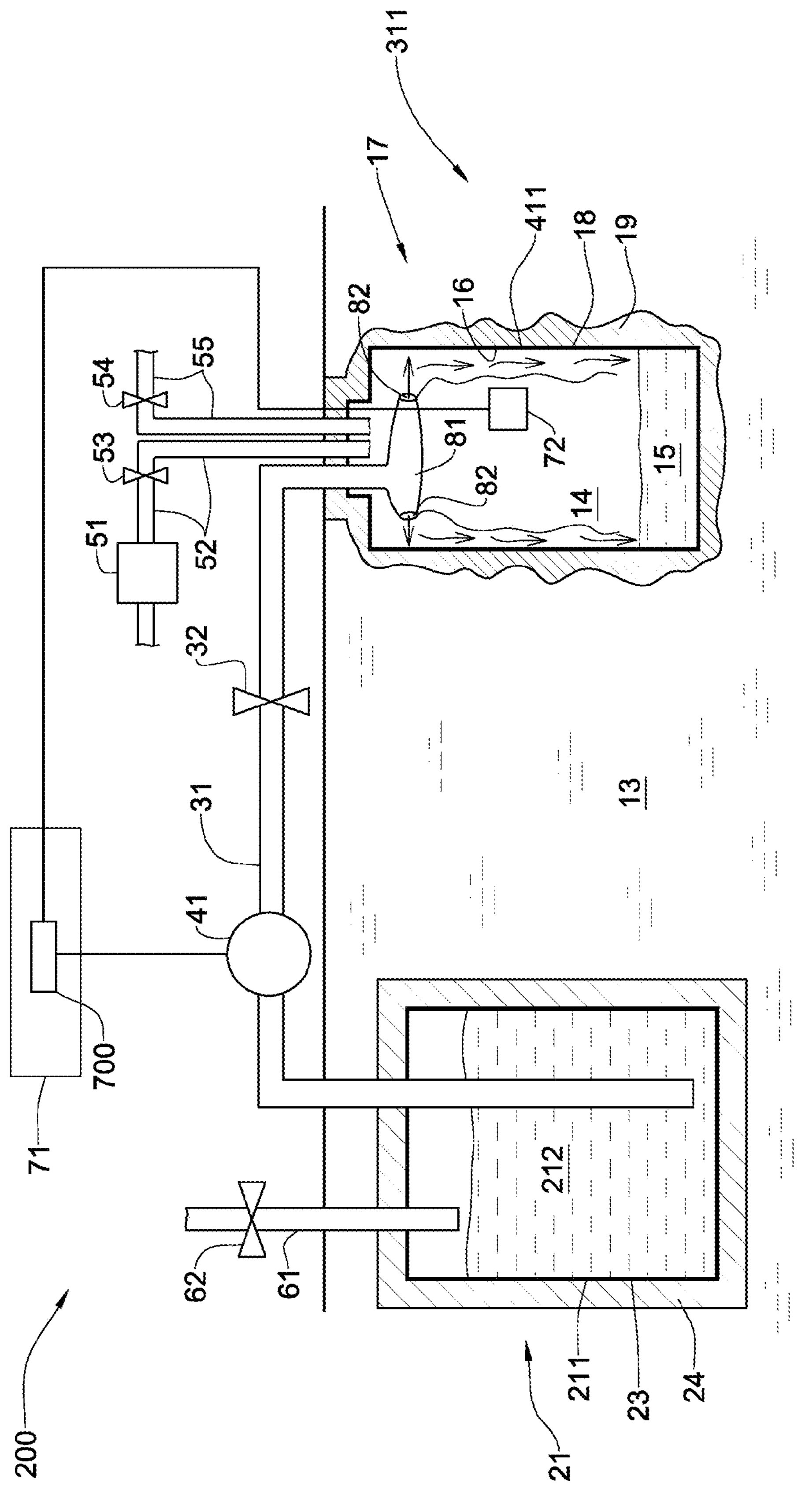

Referring to FIG. 2, a schematic cross-sectional view of a gas compression system 200 is illustrated, according to another embodiment of the present invention. The gas compression system 200 differs from the gas compression system 10 in FIG. 1 in that it includes a gas compressing vessel 311 having a cylindrical shape. Accordingly, in the gas compression system 200, a circular cross-section of an inner side of thermally conductive walls 411 of the gas compressing vessel 311 is implemented in a horizontal plane.

In this embodiment, the nozzle(s) 82 of the water flow distributor 81 are configured to direct a stream of the water pumped into the inner side of the walls 411 of the gas compressing vessel 311 in the horizontal direction, i.e., where the inner side has the substantially circular cross-section. Accordingly, the water stream provided by the water flow distributor 81 is circulated inside the gas compressing vessel 311 along its inner side of walls 411 in the horizontal plane and spirally flows down to the bottom of the gas compressing vessel 311 by gravity.

Figure 3:
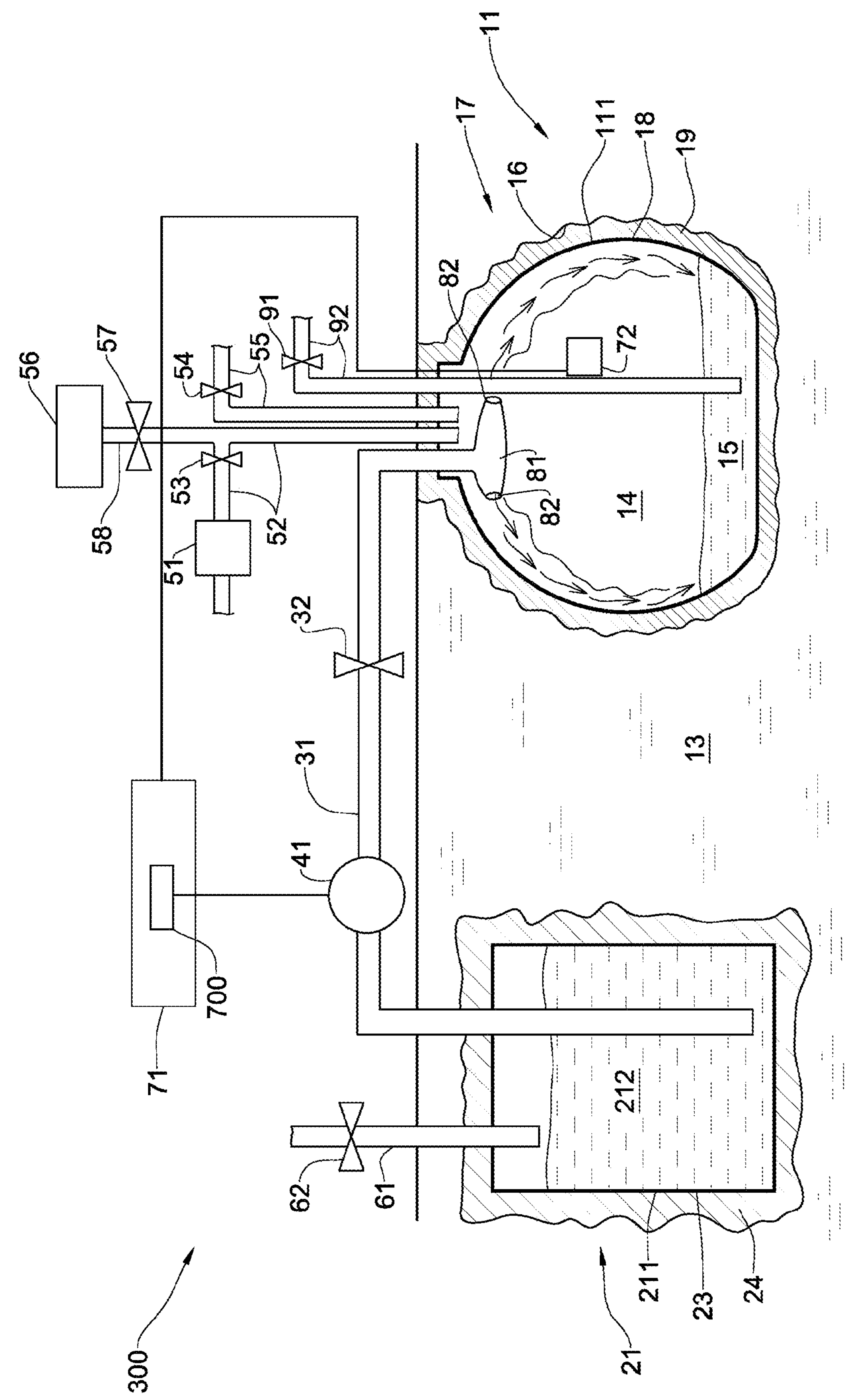
FIGS. 3 and 4 illustrate schematic cross-sectional side views of gas compression systems, according to some embodiments of the present invention, operating in a multi-cycling regime.
Figure 4:
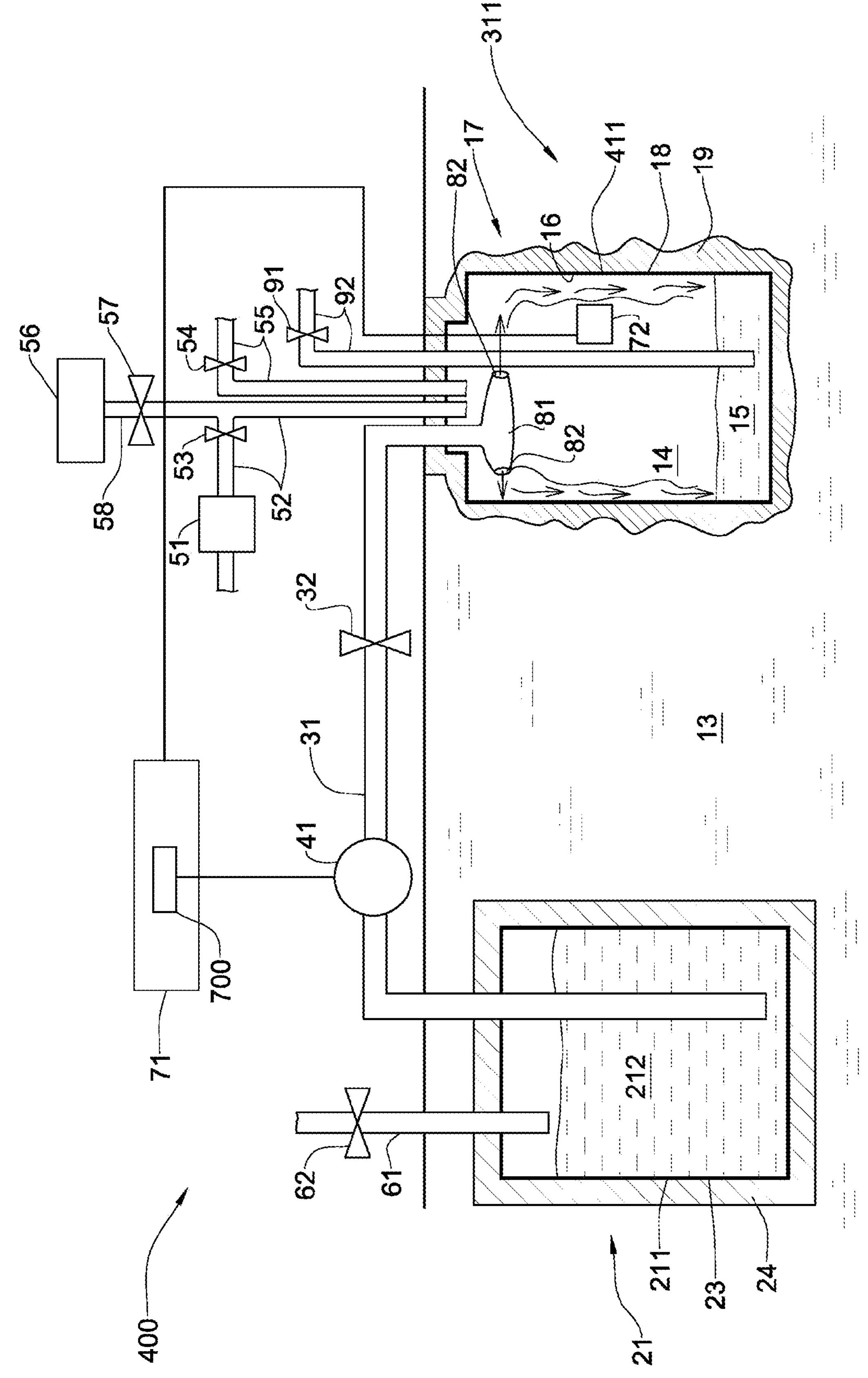

Referring to FIGS. 3 and 4 together, schematic cross-sectional views of gas compression systems 300 and 400 are illustrated, according to other embodiments of the present invention. The gas compression systems 300 and 400 differ from the gas compression systems 10 and 200 in FIGS. 1 and 2, correspondingly, in that these systems further include a water discharge pipeline 92, thereby enabling operating of the systems 300 and 400 in a multi-cycling regime. In the multi-cycling regime, after removing the water accumulated during gas compression in a first cycle as discussed above with reference to FIGS. 1 and 2, the systems are ready for supply of water for a new operating compression cycle.

The water discharge pipeline 92 is hydraulically coupled to the gas compressing vessel (11 in FIGS. 1 and 311 in FIG. 2). The water discharge pipeline 92 is configured to remove water 15 accumulated at a bottom of the gas compressing vessel 11 and 311 after gas compressing (i.e., when the system is not compressing gas). A water discharge valve 91 is arranged on the water discharge pipeline 92. The water discharge valve 91 is configured to regulate the removal of water 15 from the gas compressing vessels 11 and 311.

The compression systems 300 and 400 include a gas pump 56. The gas pump 56 is configured to provide air to the gas compressing vessels 11 and 311 at a required pressure that is sufficient to remove the water 15 accumulated at a bottom of the gas compressing vessels 11 and 311 through the water discharge pipeline 92 (after gas compressing). The compression systems 300 and 400 include an air supply manifold 58. The air supply manifold 58 is pneumatically coupled to the gas pump 56 and to the to the gas inlet manifold 52. The air supply manifold 58 is configured to supply air provided by the gas pump 56 into the gas compressing vessels 11 and 311 at the required pressure sufficient to remove the water 15 accumulated at a bottom of the gas compressing vessel 11 and 311.

According to an embodiment of the present invention, the compression systems 300 and 400 include a gas pump valve 57, arranged on the air supply manifold 58. The gas pump valve 57 is configured to regulate the supply of air into the gas compressing vessels 11 and 311. The gas pump valve 57 is also configured to prevent an escape (unwanted flow) of gas from the gas compressing vessel 11 and 311 through the air supply manifold 58.

Figure 5:
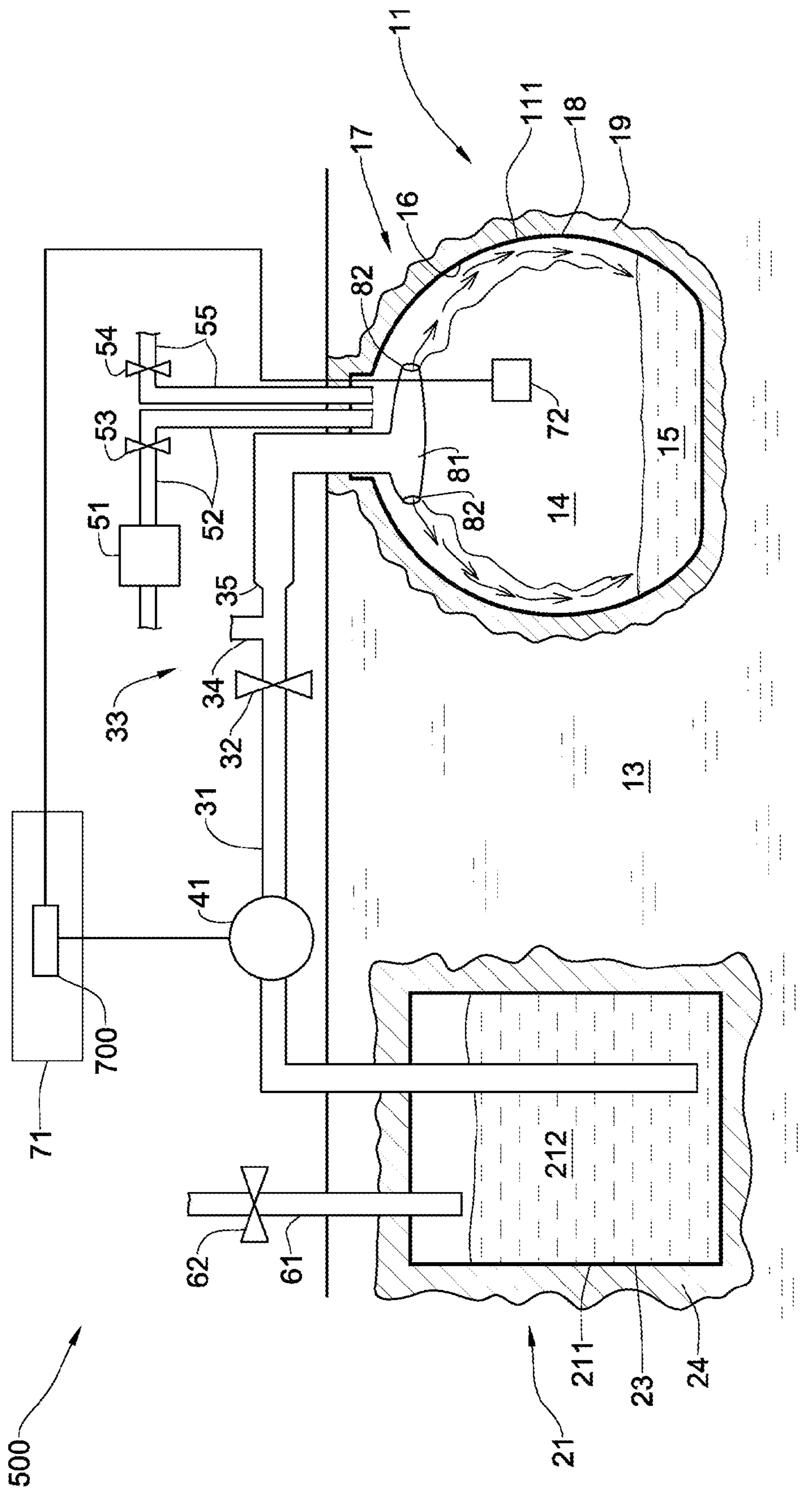
FIGS. 5 and 6 illustrate schematic cross-sectional side views of gas compression systems FIGS. 1 and 2, correspondingly, further including Venturi nozzles.
Figure 6:
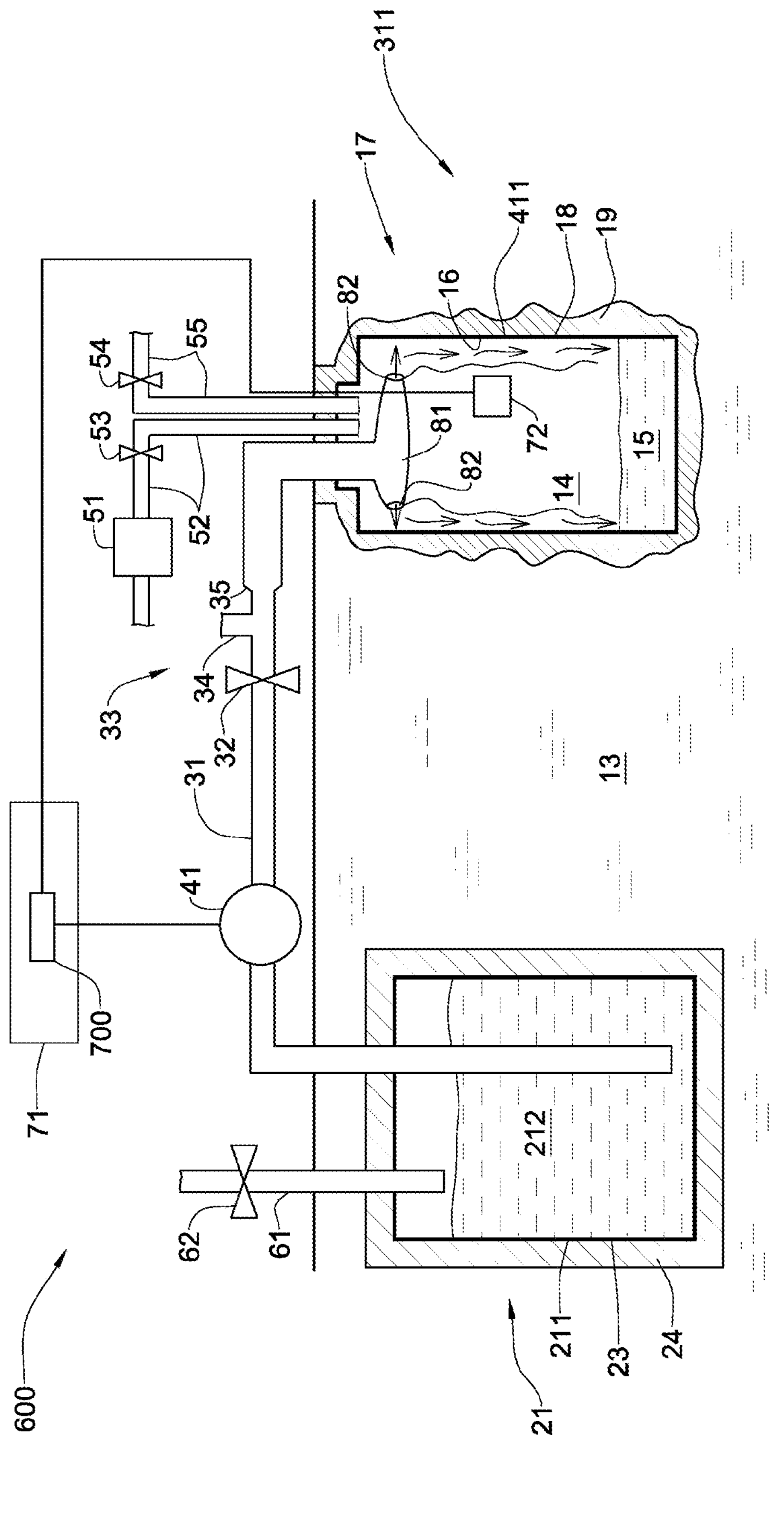

Referring to FIGS. 5 and 6 together, schematic cross-sectional views of gas compression systems 500 and 600 are illustrated, according to other embodiments of the present invention. The gas compression systems 500 and 600 differ from the gas compression systems 10 and 200 in FIGS. 1 and 2, correspondingly, in that these systems include a Venturi pump 33. The Venturi pump 33 is arranged in the pressurized water pipeline 31 to form a part of the pressurized water pipeline 31. The Venturi pump 33 includes a Venturi air manifold 34. The Venturi air manifold 34 is coupled to the pressurized water pipeline 31, and is configured for providing air into the Venturi pump 33. The Venturi pump 33 includes a Venturi nozzle 35 coupled to the pressurized water pipeline 31. The Venturi pump 33 is configured to mix the water with the gas sucked through the Venturi air manifold 34. The Venturi nozzle 35 includes an expanding portion having an incoming cross section and an outgoing cross section. An area of the incoming cross section is less than an area of the outgoing cross section.

The Venturi nozzle 35 is configured (i) to receive a flow of fluid containing water passing from the water pressurization system 41 through the pressurized water pipeline 31 and air provided by the Venturi air manifold 34; and (ii) and to increase a pressure of the air in the fluid to a predetermined value by the expanding portion.

The increase of the pressure of the air can be evaluated in accordance with the Bernoulli principle that stipulates that the local pressure must increase as the flow is passing through the expanding portion.

It can be understood that the Venturi pump 33 can provide a further route for providing a compressed gas to the gas compressing vessels (11 in FIGS. 3 and 311 in FIG. 4) that is additional to the gas that the gas providing system 51 provides.

Figure 7:
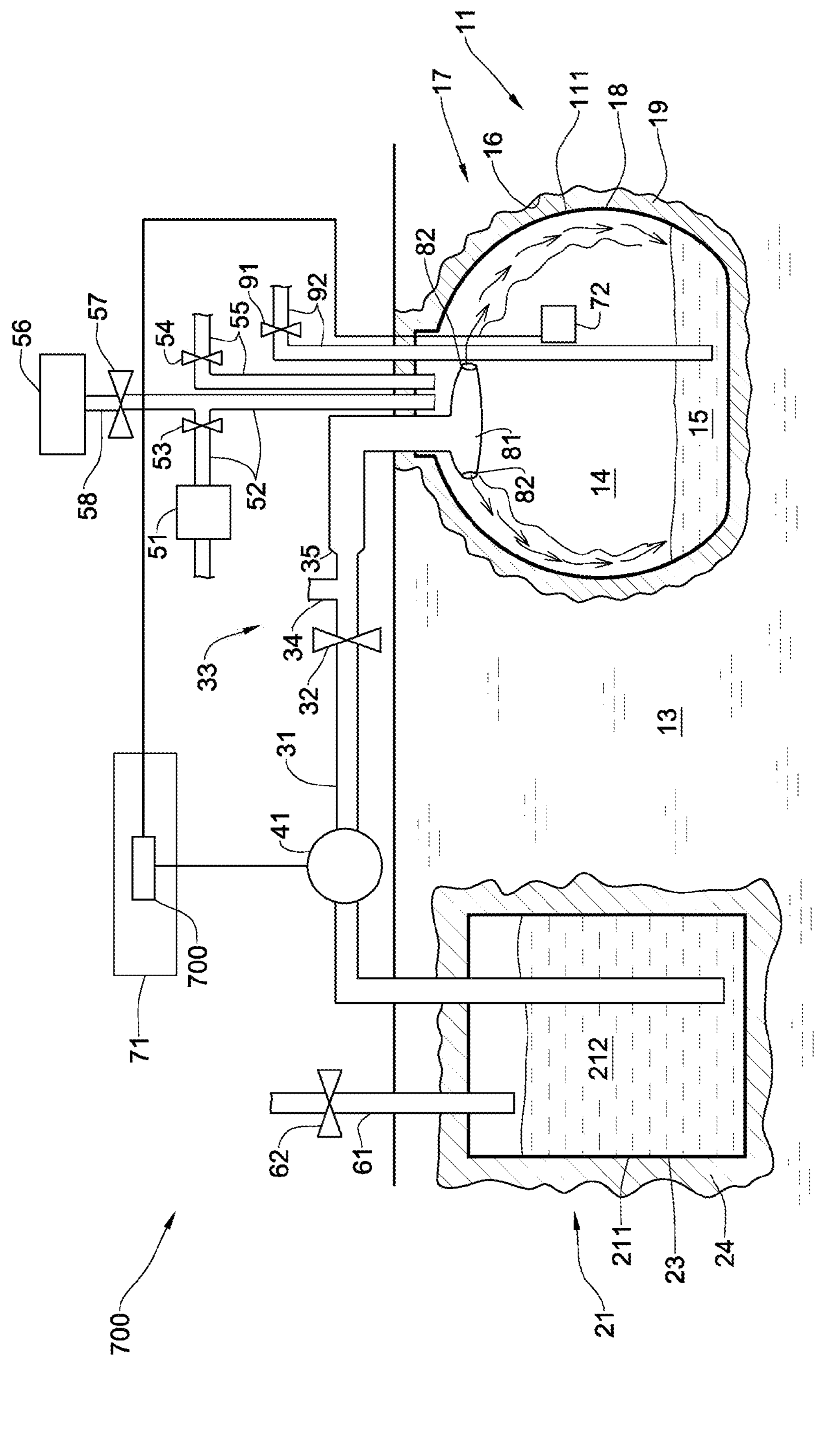
FIGS. 7 and 8 illustrate schematic cross-sectional side views of gas compression systems of FIGS. 3 and 4, correspondingly, further including Venturi nozzles.
Figure 8:
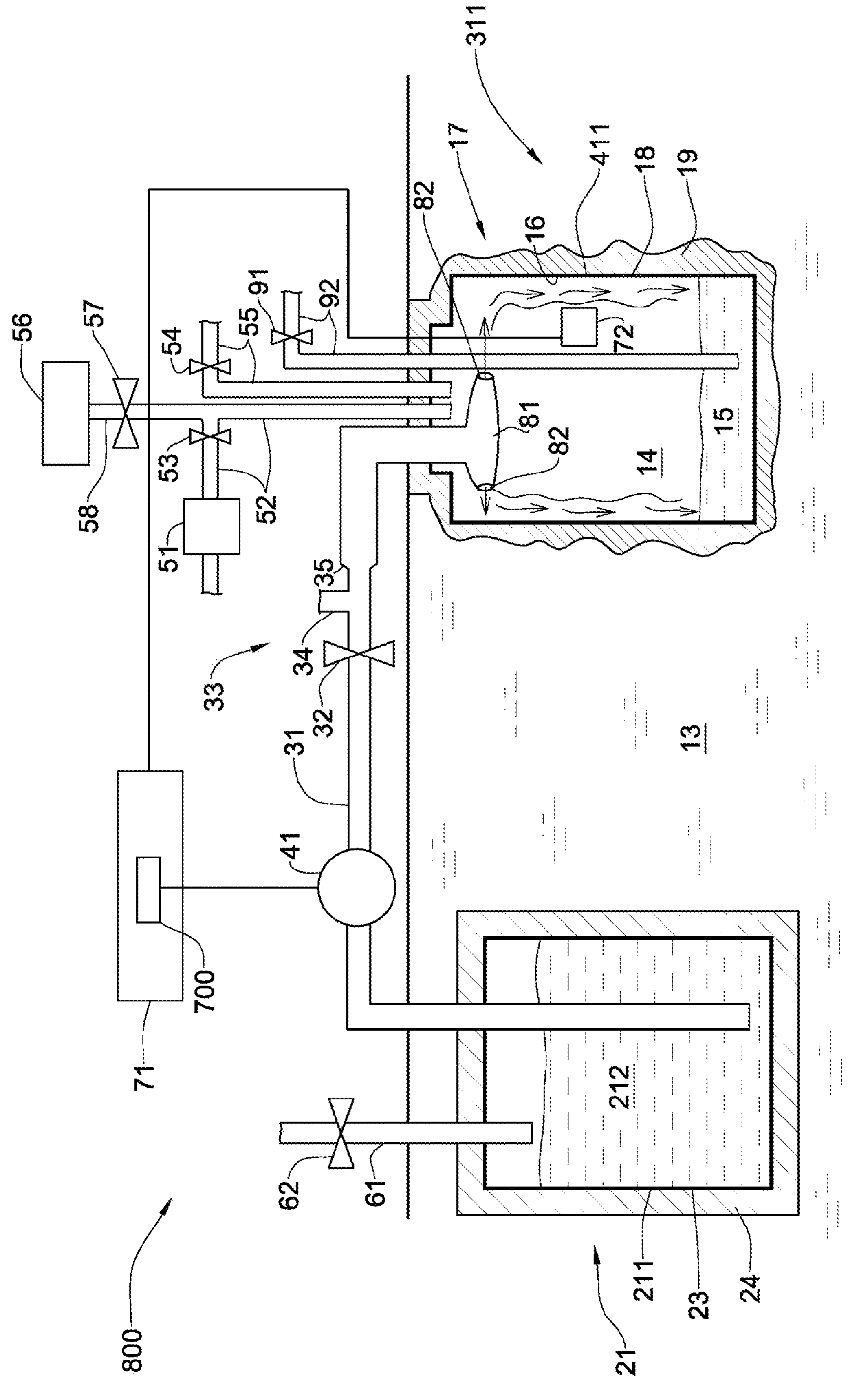

Referring to FIGS. 7 and 8 together, schematic cross-sectional view of gas compression systems 700 and 800 are illustrated, according to other embodiments of the present invention. Specifically, the embodiment shown in FIG. 7 can be considered as a combination of the embodiments shown in FIGS. 3 and 5. The embodiment shown in FIG. 8 can be considered as a combination of the embodiments shown in FIGS. 4 and 6.

The gas compression systems 700 and 800 differ from the gas compression systems 300 and 400 in FIGS. 3 and 4, correspondingly, in that these systems include a Venturi pump 33. The Venturi pump 33 is arranged in the pressurized water pipeline 31 to form a part of the pressurized water pipeline 31. The Venturi pump 33 includes a Venturi air manifold 34. The operation of the Venturi pump 33 is described hereinabove with reference to FIGS. 5 and 6.

According to some embodiments, the removing of water 15 from the gas compressing vessels (11 in FIGS. 3 and FIGS. 7) and (311 in FIGS. 4 and 8) can be done either in one step or in two steps. In particular, when the gas pressure in the gas compressing vessel 11 and 311 is rather low, the removing of water 15 is carried out in one step. The gas pump 56 is operated, the gas pump valve 57 is set to open, and air is supplied (through the air supply manifold 58) to the gas compressing vessel 11 and 311. The supplied air increases the pressure in the gas compressing vessel 11 and 311, causing the removal of water 15.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Reference numerals and symbols appearing in the appended claims are by way of illustration only and shall have no limiting effect on the scope of the claims.

Finally, it should be noted that the words “comprising”, “having” and “including” as used throughout the appended claims are to be interpreted to mean “including but not limited to”.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A compression system for compression of a gas having a temperature greater than an underground soil temperature within the earth, comprising:

a gas compressing vessel arranged underground within the earth, said gas compressing vessel configured to accumulate and store potential energy in the form of compressed gas and pressurized water;

wherein the gas compressing vessel has thermally conductive walls;

wherein the gas compressing vessel has a circular cross-section of an inner side of the thermally conductive walls at least at an upper portion of the gas compressing vessel;

wherein the gas compressing vessel has an outer side of the thermally conductive walls being surrounded by a layer of a thermally conductive material filling a space between the outer side and soil of the earth, so as to maintain the compressed gas within the gas compressing vessel at a temperature of the soil during air compression and storage;

a water supply vessel arranged underground within the earth and configured to hold water;

wherein the water supply vessel has thermally conductive walls;

wherein the water supply vessel has an outer side of the thermally conductive walls being surrounded by another layer of a thermally conductive material filling a space between the outer side and the surrounding soil, so as to hold the water within the water supply vessel at the temperature of the soil;

a pressurized water pipeline hydraulically coupled to the gas compressing vessel and to the water supply vessel, and configured to provide hydraulic communication between the gas compressing vessel and the water supply vessel;

a water pressurization system arranged on the pressurized water pipeline, the water pressurization system comprising a pump configured for controllable pumping water from the water supply vessel into the gas compressing vessel so that a desired flow rate of the water is maintained through the pressurized water pipeline; and a water flow distributor arranged within the gas compressing vessel and coupled to the water pressurization system via the pressurized water pipeline, the water flow distributor including at least one nozzle configured to direct a stream of the water pumped into the gas compressing vessel along the inner side of the thermally conductive walls of the gas compressing vessel in the direction where the inner side has the circular cross-section, thereby circulating the water stream inside the gas compressing vessel along the inner side.

2. The compression system of claim 1, wherein the gas compressing vessel has a substantially spherical shape at the upper portion.

3. The compression system of claim 1, wherein the gas compressing vessel has a substantially cylindrical shape at the upper portion.

4. The compression system of claim 1, wherein the thermally conductive material of the layer has adhesive properties sufficient for adhesion with the thermally conductive walls and the soil, thereby to facilitate heat exchange from the thermally conductive walls to the soil via the thermally conductive material of the layer (19).

5. The compression system of claim 1, wherein the thermally conductive material of the layer has adhesive properties sufficient for adhesion with the thermally conductive walls and the soil, thereby to facilitate heat exchange from the thermally conductive walls to the soil via the thermally conductive material of the layer.

6. The compression system of claim 1, further comprising:

a gas inlet manifold pneumatically coupled to the gas compressing vessel for providing gas into the gas compressing vessel for compression; and an inlet gas valve arranged on the gas inlet manifold, and configured for control of supply of the gas into the gas compressing vessel.

7. The compression system of claim 6, further comprising a gas providing system arranged on the gas inlet manifold and pneumatically coupled to the gas compressing vessel, said gas providing system configured to provide gas into the gas compressing vessel for compression.

8. The compression system of claim 1, further comprising:

a water inlet pipeline hydraulically coupled to the water supply vessel, and configured to supply water to the water supply vessel; and an inlet water valve arranged on the water inlet pipeline and configured for controlling supply of water into the water supply vessel.

9. The compression system of claim 1, further comprising a control system coupled to the water pressurization system arranged on the pressurized water pipeline, and configured to regulate the flow of the water pumped into the gas compressing vessel through the pressurized water pipeline.

10. The compression system of claim 9, wherein the control system includes:

a gas pressure sensor arranged within the gas compressing vessel, and configured for producing gas pressure sensor signals indicative of a pressure of the compressed gas in the gas compressing vessel; and an electronic controller operatively coupled to the water pressurization system and to the gas pressure sensor, the electronic controller being responsive to the gas pressure sensor signals and capable of generating control signals for actuating the pump of the water pressurization system when the gas pressure in the gas compressing vessel is less than a predetermined pressure of the compressed gas.

11. The compression system of claim 1, further comprising:

a compressed gas exchange manifold pneumatically coupled to the gas compressing vessel, the gas exchange manifold configured to supply the compressed gas from compressing vessel to a user at the desired pressure; and a gas release valve arranged on the compressed gas exchange manifold, and configured for controlling supply of the compressed gas to the user.

12. The compression system of claim 1, further comprising:

a water discharge pipeline hydraulically coupled to the gas compressing vessel, said water discharge pipeline being configured to remove water accumulated at a bottom of the gas compressing vessel after gas compressing;

a gas pump configured to provide air at a required pressure; and an air supply manifold pneumatically coupled to the gas pump and to the to the gas inlet manifold, the air supply manifold configured to supply air provided by the gas pump into the gas compressing vessel at a pressure sufficient to remove the water accumulated at a bottom of the gas compressing vessel through the water discharge pipeline after gas compressing.

13. The compression system of claim 1, further comprising a Venturi pump arranged on the pressurized water pipeline; said Venturi pump comprising:

a Venturi air manifold coupled to the pressurized water pipeline, said Venturi air manifold configured for providing air into the Venturi pump; and a Venturi nozzle coupled to the pressurized water pipeline, the Venturi nozzle including an expanding portion, said expanding portion having an incoming cross section and an outgoing cross section, an area of the incoming cross section being less than an area of the outgoing cross section; said Venturi nozzle is configured (i) to receive a flow of fluid containing water passing from the water pressurization system through the pressurized water pipeline and air provided by the Venturi air manifold; and (ii) and to increase a pressure of the air in the fluid to a predetermined value by the expanding portion.

14. A compression method for compression of a gas having a temperature greater than an underground soil temperature within the earth, the method comprising:

providing a compression system of claim 1; and activating the water pressurization system for controllable pumping water from the water supply vessel into the gas compressing vessel through the water flow distributor, so as to direct a stream of the water pumped into the gas compressing vessel along the inner side of the thermally conductive walls of the gas compressing vessel in the direction where the inner side has the circular cross-section to circulate the water flow inside the gas compressing vessel along the inner side, thereby decreasing the temperature of the gas during compression.

15. The compression method of claim 14, further comprising:

providing to the system a compressed gas exchange manifold pneumatically coupled to the gas compressing vessel, the gas exchange manifold configured to supply the compressed gas from compressing vessel to a user at the desired pressure;

providing to the system a gas release valve arranged on the compressed gas exchange manifold, and configured for controlling supply of the compressed gas to the user; and supplying the compressed gas through to the compressed gas exchange manifold to a user at a desired pressure.

16. The compression method of claim 14, further comprising:

providing to the system a water discharge pipeline hydraulically coupled to the gas compressing vessel, said water discharge pipeline being configured to remove water accumulated at a bottom of the gas compressing vessel after gas compressing;

providing to the system a gas pump configured to provide air at a required pressure;

providing to the system an air supply manifold pneumatically coupled to the gas pump and to the gas inlet manifold the air supply manifold configured to supply air provided by the gas pump into the gas compressing vessel at a pressure sufficient to remove the water accumulated at a bottom of the gas compressing vessel through the water discharge pipeline after gas compressing; and removing water accumulated at a bottom of the gas compressing vessel after gas compressing, by supplying air by the gas pump into the gas compressing vessel at a pressure sufficient to remove the water accumulated at a bottom of the gas compressing vessel through the water discharge pipeline.

17. The compression method of claim 14, further comprising:

providing to the system a Venturi pump arranged on the pressurized water pipeline; said Venturi pump comprising:

a Venturi air manifold coupled to the pressurized water pipeline, said Venturi air manifold configured for providing air into the Venturi pump; and a Venturi nozzle coupled to the pressurized water pipeline, the Venturi nozzle including an expanding portion, said expanding portion having an incoming cross section and an outgoing cross section, an area of the incoming cross section being less than an area of the outgoing cross section; said Venturi nozzle being configured (i) to receive a flow of fluid containing water passing from the water pressurization system through the pressurized water pipeline and air provided by the Venturi air manifold; and (ii) and to increase a pressure of the air in the fluid to a predetermined value by the expanding portion; and increasing a pressure of the air to a predetermined value by the Venturi pump.

* * * * *